Figure 1:
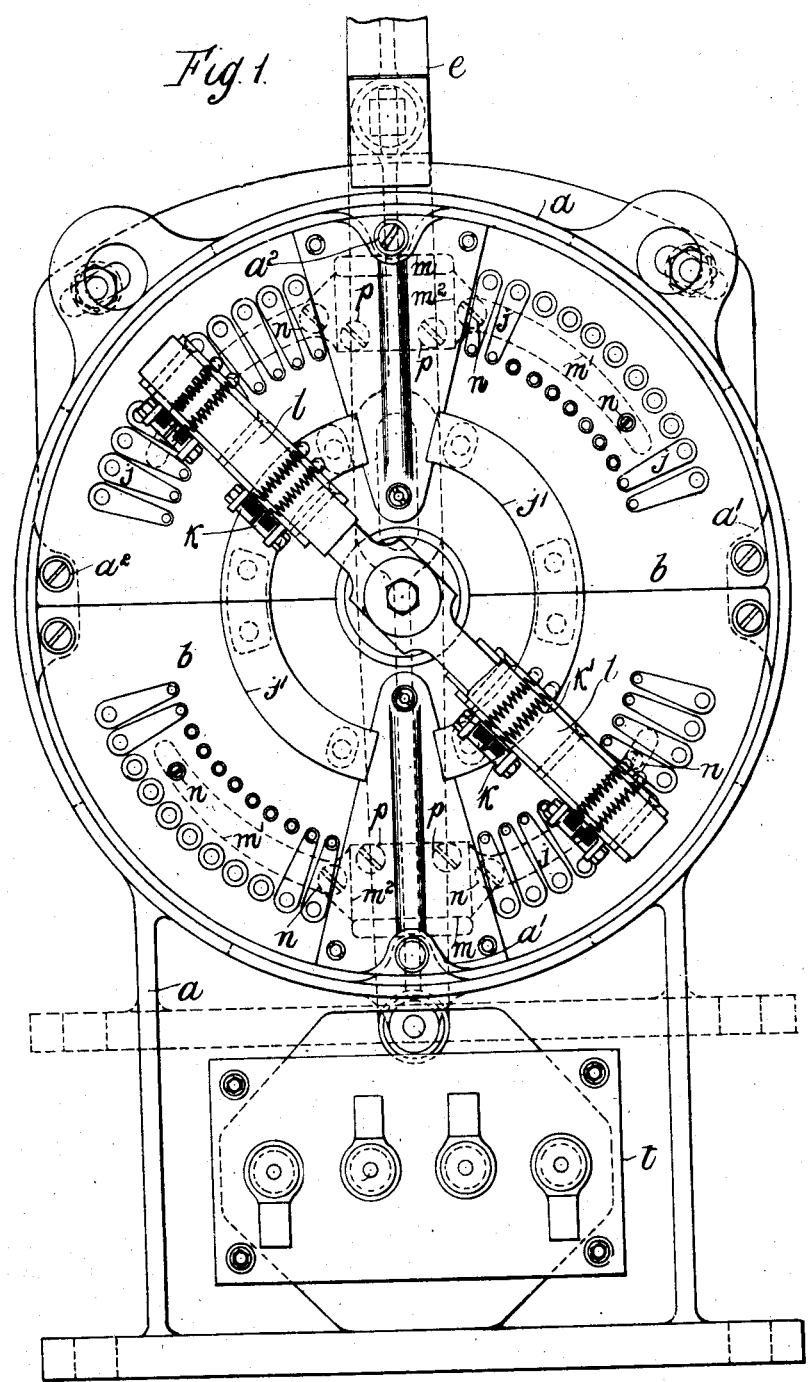

No. 833,129. PATENTED OCT. 9, 1906.
J. B. DUCKITT.
ELECTRIC CONTROLLER AND STARTING SWITCH.
APPLICATION FILED NOV. 4, 1905.

6 SHEETS—SHEET 1.

WITNESSES
Alvin J. White
W. P. Burke

INVENTOR
John Bruntnall Duckitt
BY
Richards
ATTYS

No. 833,129. PATENTED OCT. 9, 1906.
J. B. DUCKITT.
ELECTRIC CONTROLLER AND STARTING SWITCH.
APPLICATION FILED NOV. 4, 1905.

6 SHEETS—SHEET 4.

WITNESSES
INVENTOR
John Brentnall Duckitt
BY
ATTYS

No. 833,129. PATENTED OCT. 9, 1906.
J. B. DUCKITT.
ELECTRIC CONTROLLER AND STARTING SWITCH.
APPLICATION FILED NOV. 4, 1905.

6 SHEETS—SHEET 5.

WITNESSES
Alvin G. White
W. P. Burke

INVENTOR
John Brentnall Duckitt
BY
Richards
ATTYS

No. 833,129. PATENTED OCT. 9, 1906.
J. B. DUCKITT.
ELECTRIC CONTROLLER AND STARTING SWITCH.
APPLICATION FILED NOV. 4, 1905.
6 SHEETS—SHEET 6.
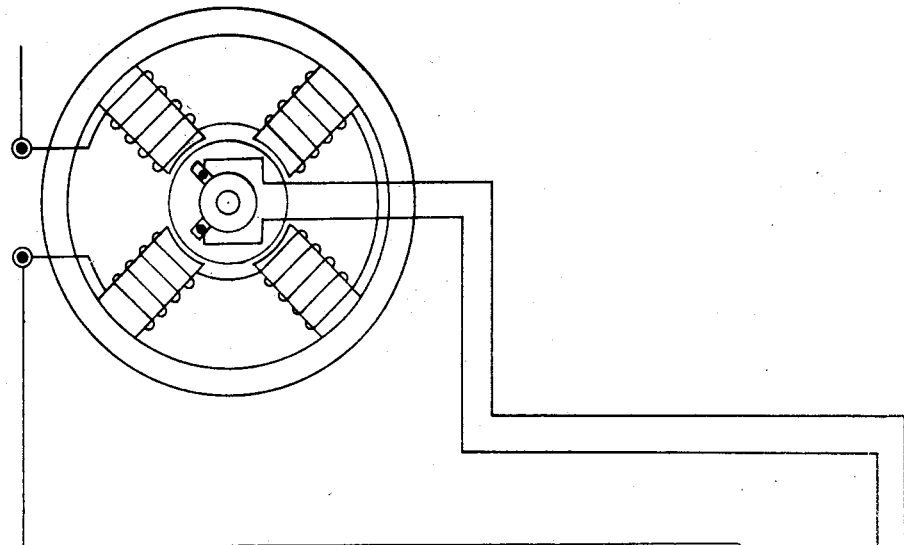
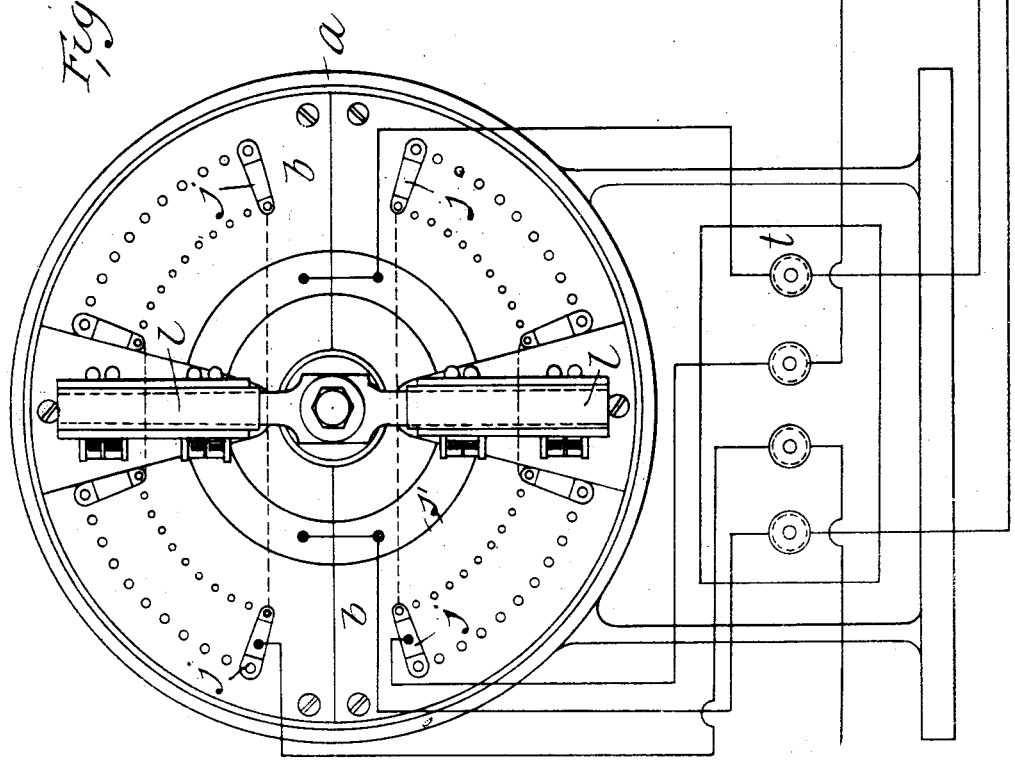
Fig. 7
WITNESSES
Alvin E. White
W. P. Burke
INVENTOR
John Brentnall Duckitt
BY Richards
ATTYS

UNITED STATES PATENT OFFICE.

JOHN BRENTNALL DUCKITT, OF HYDE, ENGLAND, ASSIGNOR OF ONE-HALF TO THE FIRM OF JOSEPH ADAMSON AND COMPANY, OF HYDE, ENGLAND.

ELECTRIC CONTROLLER AND STARTING-SWITCH.

No. 833,129.　　　　Specification of Letters Patent.　　　Patented Oct. 9, 1906.

Application filed November 4, 1905. Serial No. 285,938.

*To all whom it may concern:*

Be it known that I, JOHN BRENTNALL DUCKITT, electrical engineer, a subject of the King of Great Britain, residing at 179 Great Norbury street, Hyde, in the county of Chester, England, have invented new and useful Improvements in Electric Controllers and Starting-Switches, of which the following is a specification.

This invention relates to improvements in electric controllers and starting-switches of the face-plate pattern with metallic resistances, and has for its object the production of a strong magnetic field at the points of contact for blowing out any sparks which may be formed in passing from one contact to another or breaking circuit to the "off position" without the adoption of an auxiliary coil especially for the purpose. I accomplish this by constructing the resistance (or resistances) of a magnetic material in the form of strips wound spirally, carefully insulated between the layers, and suitably subdivided to give the necessary resistance between the contacts. This resistance is carried on a wrought-iron sleeve, from which it is carefully insulated electrically and in which fits the spindle secured to the wrought-iron arm carrying the contact-fingers. This wrought-iron sleeve is carried by and firmly secured to the slate base on which the various contacts, which are replaceable from the front, are mounted. I arrange the contacts in the form of a semicircle or quadrant upon the slate, and immediately behind them, upon the back of the slate, a yoke of magnetic material, such as cast-iron, is secured, which projects backward so as to come over and just clear of the outside of the resistance, forming a path for the magnetic field. The connecting-studs and connections from the contacts are so constructed that this yoke can be arranged with two horns running down behind the contacts, which are secured in position by means of wrought-iron studs countersunk into the slate immediately under the edges of the contacts and thoroughly insulated electrically from them, the object being to shorten and concentrate the strength of the blow-out field precisely at the points required.

Figure 2:
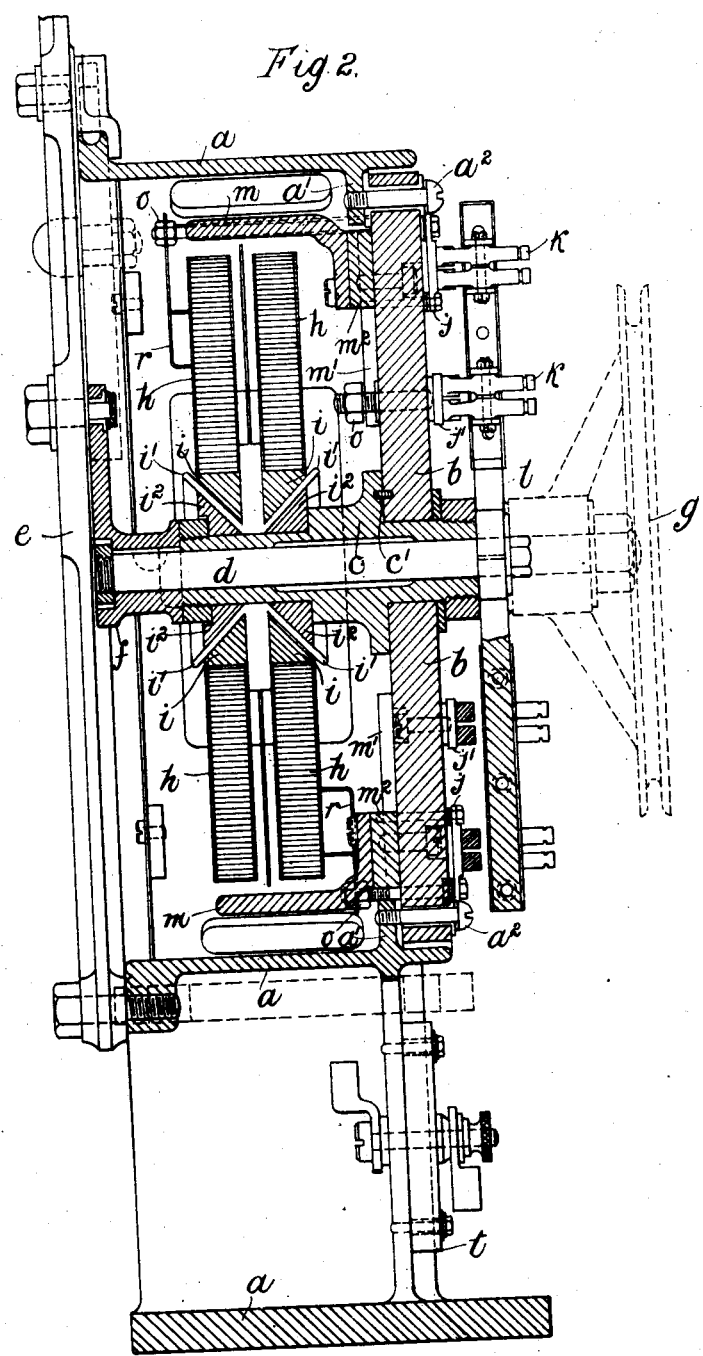
Figure 3:
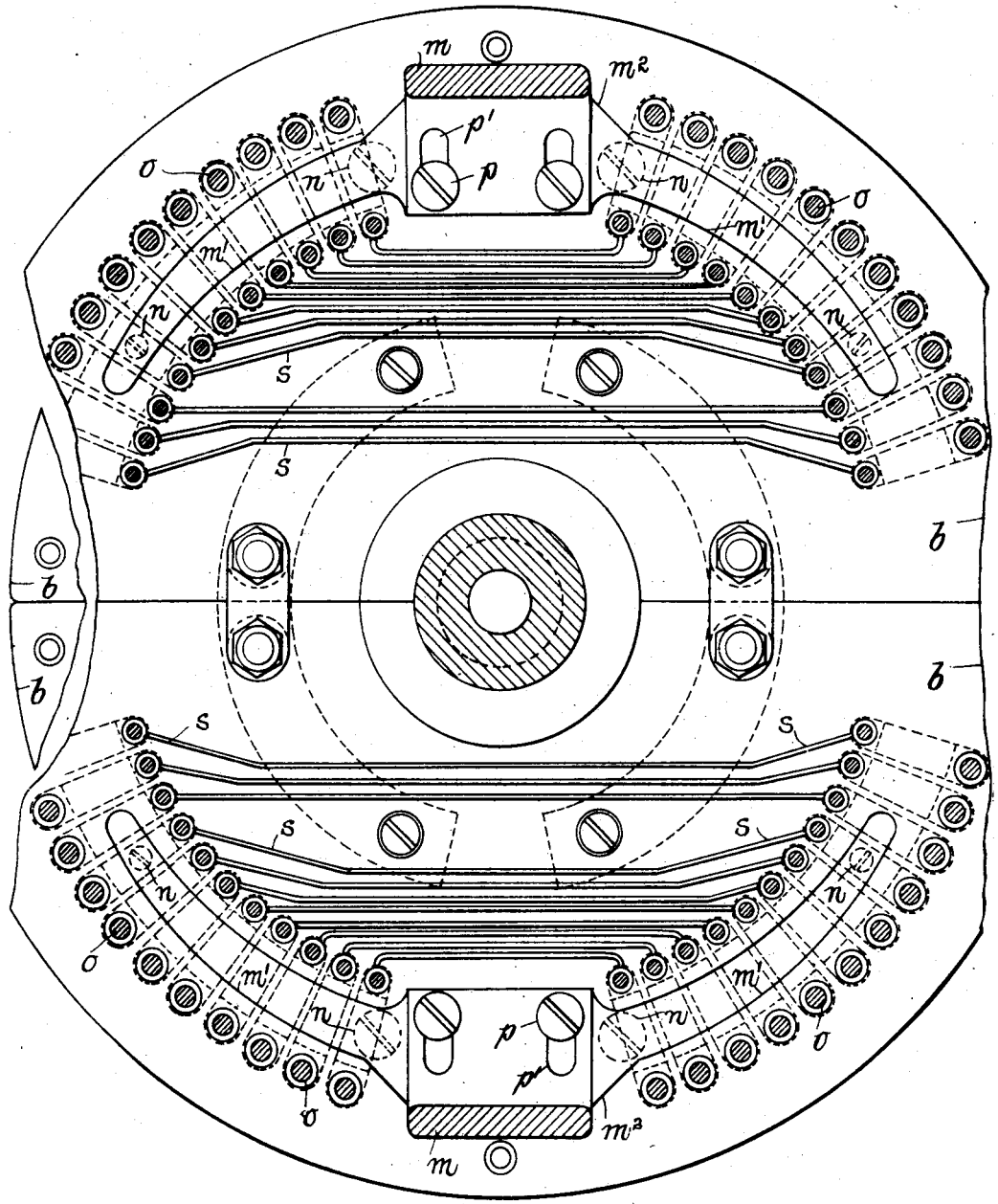
Figure 4:
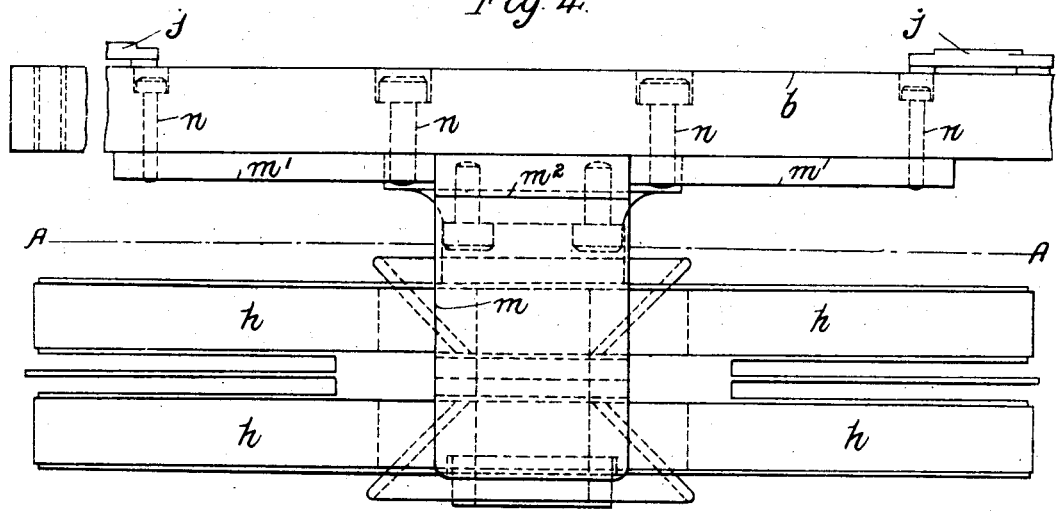
Figure 5:
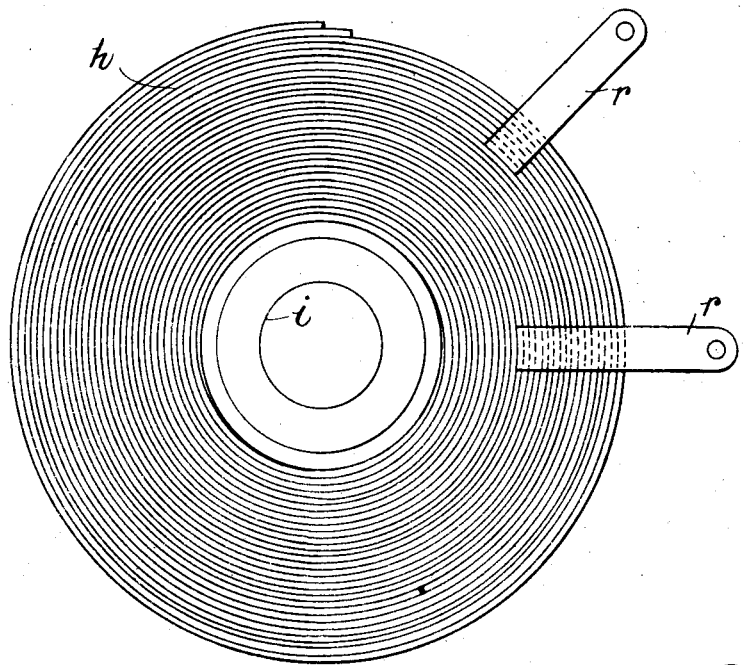
Figure 6:
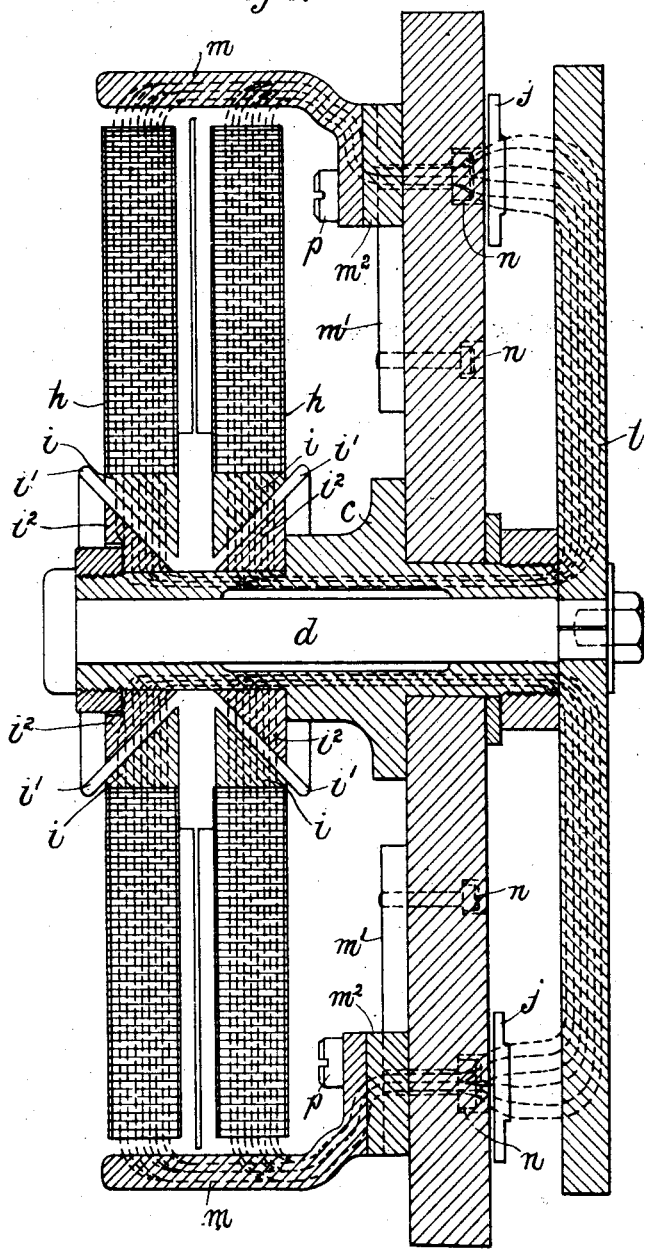

In the accompanying six sheets of drawings, Figure 1 is a front elevation of my improved electric controller or starting-switch of the face-plate pattern. Fig. 2 is a sectional view of the same, taken vertically through the center. Fig. 3 is a view showing the back of the slate and also the cross connections between the contacts, the section being taken on the plane of the line A A on Fig. 4. Fig. 4 is a plan of the slate, resistances, yoke, and horns. Fig. 5 is an elevation illustrating the method of winding the resistances in a volute and also shows the copper connection-strips. Fig. 6 is a sectional drawing taken vertically through the center and showing the path of the magnetic field. Fig. 7 is a diagram showing the electrical connections between the contacts and controller-terminals and also from these terminals to a reversing series motor.

In the views, $a$, Figs. 1 and 2, designates the box or casing of cast-iron having open spaces for ventilation around its outer edge and mounted on feet, which may be long or short, as required, the long base being utilized to carry the terminal slate, which when the short base is adopted is mounted on the top of the casing. This casing has lugs $a'$ cast inside the front edge, to which semicircular disks $b$, of insulating material, such as slate, are secured by means of the brass screws $a^2$.

$c$ is a wrought-iron sleeve which is carried by and firmly secured in the centers of the semicircular slates $b$ and has a pin $c'$ to prevent any turning movement. A brass controller-spindle $d$ runs through the center of the sleeve $c$, and this spindle may be operated in the usual way by a hand-lever $e$ and crank-arm $f$ or by a wheel $g$, fixed on the spindle $d$ and actuated by ropes or like connections.

The resistances $h$ are wound, as shown in Fig. 5, in a volute of strip magnetic material, each layer being insulated from adjoining layers by thin mica or other suitable insulating material, and are wound upon cast-iron cones $i$, which are mounted upon a second set of cast-iron cones $i^2$, the two sets of cones $i$ $i^2$ being insulated by conical mica or other insulating washers $i'$. The cones $i^2$ are mounted on the wrought-iron sleeve $c$ and are held up tight by the circular nut fitted on the end of the sleeve.

$j$ represents the contact-steps, and $j'$ the plates which are carried upon the front of the slate $b$ in the form of quadrants; $k$, the contact-fingers, the pressure of which upon the contacts $j$ and $j'$ is regulated by springs $k'$. (Shown in Fig. 1.)

$l$ is the wrought-iron contact arm or lever, which is securely fixed to the spindle $d$ and on which are fixed the plates carrying the contact-fingers.

$m$ represents adjustable yoke-pieces which project out backward from the back of the slate $b$ over the resistances $h$, Fig. 4, these yoke-pieces being made adjustable by means of the screws $p$ and slots $p'$ (shown on Figs. 3 and 4) to enable the yoke to be brought as near to the resistances as possible and also to allow for any slight variation in the diameter of the resistances. The yoke-pieces $m$ are fixed to cast-iron plates $m^2$, having horns $m'$ running down immediately behind the contact-steps $j$ and quite clear of the screws which secure these contact-steps in position.

$n$ represents studs of wrought-iron countersunk into the front of the slate $b$ and screwed into the horns $m'$, fulfilling the double purpose of firmly securing the plates $m^2$ and horns $m'$, Fig. 4, to the slate and also concentrating the magnetic field across the edges of the contacts $j$, Fig. 6, from which they are carefully insulated.

$o$ represents connecting-studs of brass or other suitable material, which are carried by the slate $b$ and to which are secured at one end the renewable contacts $j$, the other ends being carried out such a distance that they enable the copper connections $r$ from the resistances $h$ to be coupled direct to them in such a manner that neither they nor the connections foul the yoke $m$ or the horns $m'$ in any way and also so that the connections from the resistances $h$, which are of flat copper strip, run out to their respective connection studs $o$ in rotation without any bends or crossing. There are cross connections $s$ between the contacts on the back of the slate $b$, as shown in Fig. 3.

In operation upon switching off the first block the current flows through the whole of the resistances $h$, which being wound in a spiral or volute with a large number of turns act as solenoids and produce a powerful magnetic field, the circuit of which passes through the sleeve $c$, along the iron arm $l$, and from this arm across to the iron studs $n$, which concentrate the magnetic lines at right angles to the face of the contacts $j$, (blowing out any spark.) From the studs $n$ the magnetic field passes to the iron horns $m'$, the plate $m^2$, and along the yoke $m$ backward and immediately over the outside of the resistances $h$, the space between the resistances $h$ and the yoke $m$ being reduced to a minimum by means of the adjusting-screws $p$ and slots $p'$. From the yoke $m$ the magnetic lines pass down through the resistances $h$, which, being constructed of magnetic material, are thus utilized to form part of the magnetic circuit, besides producing the magnetic field, all as shown in Fig. 6. Similar action also takes place in switching from one contact $j$ to another.

My improvements may be applied to any form of starting or reversing switch of the face-plate type with subdivided metallic resistance and contacts for either starting, regulating, or reversing direct-current motors.

What I claim, and desire to secure by Letters Patent in the United States, is—

1. The combination with the contacts of controllers of the face-plate type, said contacts being arranged on plates of insulating material, of horns of magnetic material with iron studs fitted immediately behind the contacts, and a yoke-piece connected to same and projecting out backward clear of the resistance to concentrate a magnetic field across the edges of the contacts where the current is broken, all substantially as described.

2. In combination, in controllers of the face-plate type, contacts arranged on plates of insulating material, an iron sleeve, fixed centrally in said insulating plates, resistances wound in a volute of magnetic strip mounted on the sleeve, an iron contact-arm, studs, a yoke-piece and horns forming a complete magnetic circuit in a magnetic field produced by the winding of the resistances in a volute of magnetic strip material all substantially as herein set forth.

In testimony whereof I have signed my name to this specification in the presence of two subscribing witnesses.

JOHN BRENTNALL DUCKITT.

Witnesses:
  H. B. BARLOW,
  HERBERT ROWLAND ABBEY.